Dec. 16, 1930.   F. L. BOYD   1,785,723
APPARATUS FOR PRODUCING FIRE EXTINGUISHING FOAM
Filed June 16, 1927
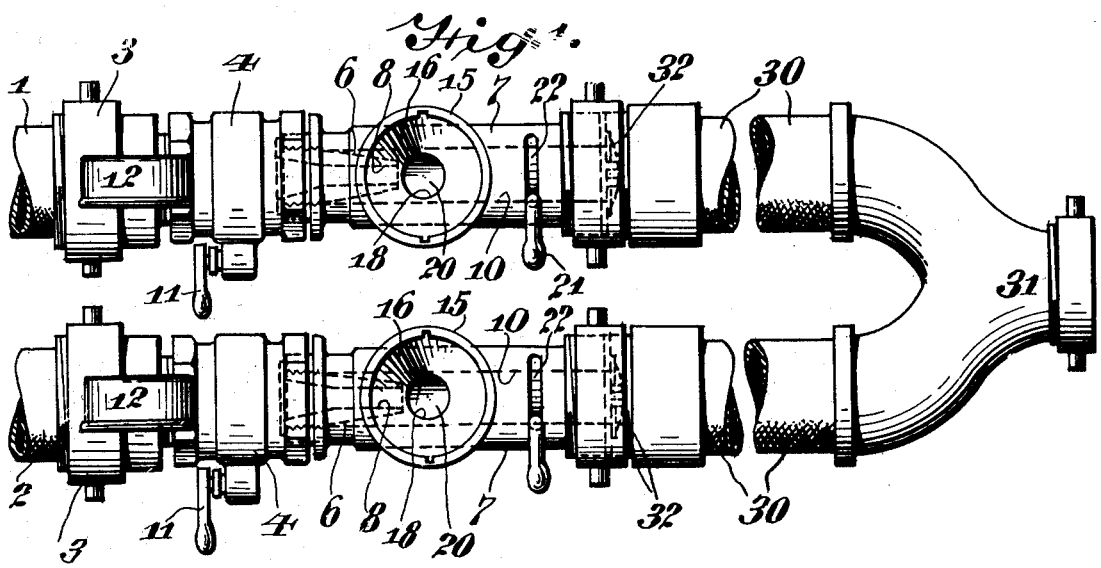
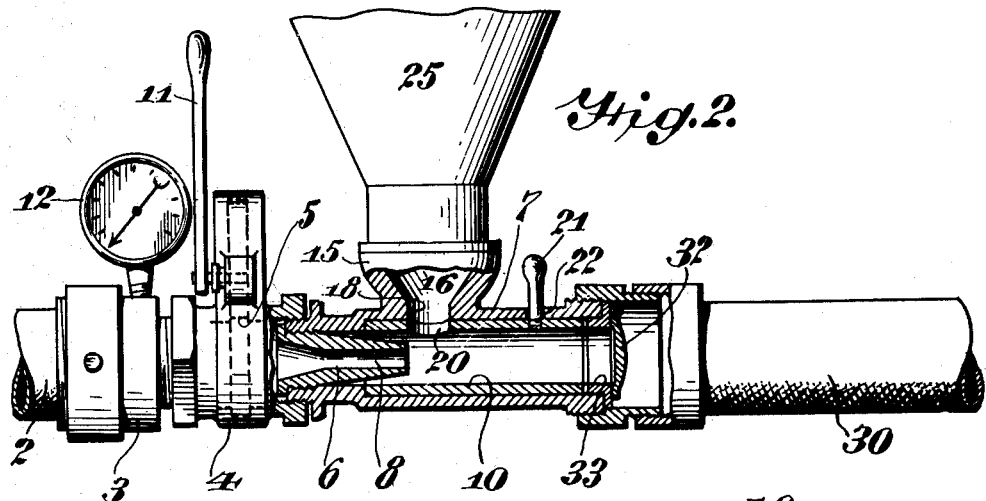
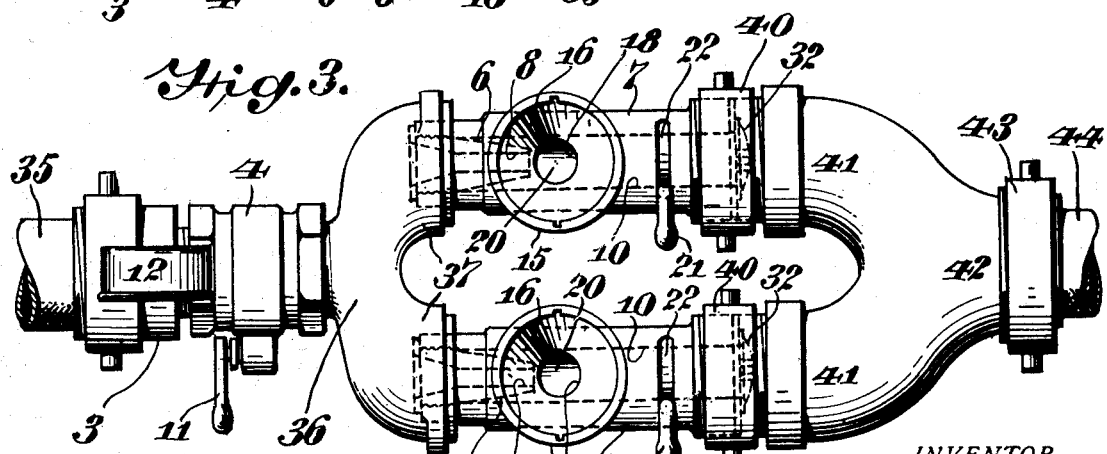

Patented Dec. 16, 1930

1,785,723

UNITED STATES PATENT OFFICE

FISHER L. BOYD, OF HAVERFORD, PENNSYLVANIA, ASSIGNOR, BY MESNE ASSIGNMENTS, TO NATIONAL FOAM SYSTEM, INC., OF PHILADELPHIA, PENNSYLVANIA, A CORPORATION OF DELAWARE

APPARATUS FOR PRODUCING FIRE-EXTINGUISHING FOAM

Application filed June 16, 1927. Serial No. 199,277.

My invention relates to methods and apparatus by the employment of which fire extinguishing foam may be continuously produced.

In certain methods and apparatus heretofore employed the foam producing substances have been previously mixed together, including usually a stabilizing substance, and introduced together into a flowing stream, such as water, in which the said substances are soluble. In certain other methods and apparatus which have been proposed the foam producing substances have been introduced separately into a single stream of water at substantially the same point therein. It may be noted that these substances when dry are inert with respect to each other but when dissolved react to produce a foam. In both of these methods to which I have referred reaction between the said substances takes place immediately and in proximity to their point of introduction into the flowing stream of water, as a result of which a certain amount of back pressure is produced whereby there is a tendency of the foam to enter the discharge openings by means of which the substances are introduced into the flowing stream of water or other liquid which may be employed and interfere more or less with the introduction of the substances thereinto.

One of the objects of my invention is to overcome the objections incident to the methods and apparatus heretofore used and as above suggested and provide a means whereby the dissolved or partially dissolved separate substances are not permitted to contact and unite or react until after they have moved forward a substantial distance from the point of their separate introduction into separate flowing stream of water or other liquid in which they may be soluble and which may be employed.

It also is an object of the invention to provide means whereby back pressure, resulting from the formation of foam after the uniting or combining of the solutions of the separate substances to interfere with the free discharge of the said substances into the respective flowing solvent streams, is prevented.

In order to effect the purposes of my invention I provide two separate streams of water or other solvent into which the separate substances are introduced which streams, after the introduction of the said substances and at a point substantially beyond the point of introduction thereof, are joined into a single stream whereby the foam produced by the reactions between the dissolved substances is produced at a point distant from their points of introduction into the said streams.

The foam having been produced by the reactions between the substances in solution or in partial solution in the two flowing streams which are united or brought together as above described, it may be applied to a fire to smother and extinguish the same in known manner.

In order that the invention may be clearly and more readily understood reference may be had to the accompanying drawing in which I have illustrated certain forms of apparatus embodying novel features of construction and by the employment of which the method may be practically carried out.

In the drawing:

Fig. 1 is a top plan view of one form of apparatus of novel construction by means of which the method invented by me may be carried out;

Fig. 2 is a view partly in side elevation and partly in longitudinal section of a portion of said apparatus; and Fig. 3 is a top plan view of a modified construction of apparatus embodying novel construction and by which the method may be practised.

In Figs. 1 and 2 of the drawing I have shown portions of two pipes or tubes 1 and 2 for supplying water to that portion of the apparatus by means of which the substances employed for producing fire extinguishing foam may be separately introduced into separate streams of water or other solvent liquid, which streams are thereafter united or brought together as hereinbefore indicated. The pipes 1 and 2, respectively, are connected by means of couplings 3 to valve casings 4 within which quick-acting valves 5 are located and are adapted to be moved transversely of the openings therethrough for controlling the passage of water to nozzles 6 which are mounted in the rear ends of tubular casings 7. These nozzles are provided with bores 8 of reduced diameter for effecting an increase in the rate of speed of the flow of the water through the valve sleeves 10 located within the tubular casings 7.

For actuating the valves 5 I have provided handles 11 which are pivotally mounted upon the outside of the casings 4. For indicating the pressure of the water within the pipes 1 and 2 I have provided pressure gages 12.

The tubular casings 7 are provided with upwardly extending projections 15 which have flared openings 16 therein the lower ends of which openings are of relatively small size and extend through the adjoining walls of the tubular casings 7 as indicated at 18. These openings are adapted to be opened and closed by means of valve sleeves 10 which are provided with openings at 20 which are adapted to be brought into registry with the openings 18. For actuating the valve sleeves 10 I have provided handles 21 which extend through slots or openings 22 in the tubular casings 7. By means of the handles 21 the valve sleeves may be rotated into positions to bring the openings 20 therein into registry with the openings 18 or into positions to locate imperforate portions of the said valve sleeves over the openings 18 to thereby close the same.

The discharge ends of the nozzles 6 are located in adjoining relation to the inner ends of the openings 18, as shown in the drawing. As there shown, the ends of the said nozzles are practically flush or in alinement with the rear edges of the openings 18 and the openings 20 when the latter are in registry with the openings 18 as shown in Fig. 2. As has been pointed out already, the presence of these nozzles with reduced bores 8 effects or causes acceleration of the flow of water therethrough and the discharge thereof into the valve sleeves 10 creates partial vacuum therein which operate to cause or accelerate the flow of powdered material through the openings 18 and 20 from the hoppers 25 which are mounted upon the upper ends of the projections 15. In other words, the discharge of liquid from the nozzles 6 produces a suction action to effect or aid in effecting discharge of the powder from the hoppers 25 into the flowing streams of liquid within the valve sleeves 10. These nozzles cooperating with the valve sleeves constitute ejectors for withdrawing the powder from the hoppers 25.

Any suitable known substances may be employed for producing the fire extinguishing foam. Those generally used and which are preferred by me are aluminum sulphate in powdered form of a fineness which will permit it to flow through a forty mesh screen, and powdered bicarbonate of soda. These substances may be placed separately in the hoppers 25 and discharged separately therefrom into the separate flowing streams of water or other solvent liquid.

It is not desirable that these two substances be combined or mixed together prior to the time when they are used for foam producing purposes because no matter with what care they may be handled a certain amount of deterioration takes place due to the absorption of moisture from the atmosphere and perhaps from other causes. When these substances are mixed together in the presence of water or other suitable liquid in which they are soluble reactions take place, resulting in active effervescence and in the production of a great amount of foam. In order to strengthen or toughen said foam or to increase the surface tension of the bubbles thereof stabilizing substances are employed. The substance employed for the latter purpose usually consists of licorice extract in powdered form, but other substances may be employed. The licorice extract powder, when it is the substance employed as the stabilizer, preferably is mixed in requisite known quantity with the bicarbonate of soda, but may be mixed if preferred with the aluminum sulphate; or the amount of stabilizing substance employed may be divided into two parts and one part thereof mixed with the powdered aluminum sulphate and the other part with the powdered bicarbonate of soda. The foam producing substances, such for example as aluminum sulphate and bicarbonate of soda in preferred known proportions or quantities, in powdered form, and one or the other or both of them being in admixture with a requisite quantity of a stabilizing substance, are stored or kept separately. The said foam producing substances with the stabilizing substances in admixture therewith, as above described, when it is desired to use the same for foam producing purposes, are introduced separately into the respective hoppers 25 and are discharged therefrom into the separate chambers within the valve sleeves 10 rotatably mounted within the tubular casings 7 as previously described. It will be understood that the proportions of the foam producing substances may be varied as desired and also that the admixture of said substances with the stabilizing substance or substances may be varied without in any way affecting the method invented by me.

The separate substances introduced into the separate flowing streams of water or other dissolving liquid which may be used flow forwardly out of and from the tubular casings 7 or the valve sleeves 10 therein through pipes 30 which may be of any length desired and are united or brought together at 31 in a single pipe. In the meantime the substances separately have been dissolved or partially dissolved within their respective streams.

Immediately, however, upon the confluence or uniting of the said streams reaction takes place between the said substances and the foam is produced. The confluence of the separate streams may be effected at a point located in such relation to the point of application of the foam as may be desired or found to be most practical.

The formation of the foam may under some circumstances create back pressure within the pipes 30 which might result in the presence of foam within the valve sleeves 10 which might interfere with the proper introduction of the substances from the hoppers 25. In order to prevent such an occurrence I have provided check valves 32 mounted upon carriers 33 connected or secured to the forward ends of the tubular casings 7. These valves open freely to permit a forward flow of the streams from the pipes 1 and 2 through the valve casings or valve sleeves 10 and thence into and through the pipes 30, but act automatically to prevent a reverse flow into the valve sleeves 10 as a result of back pressure which might happen from some unexpected cause.

In Fig. 3 of the drawing I have shown a construction which does not differ in principle from that illustrated in Figs. 1 and 2 but does differ therefrom in that a single pipe 35 is employed for supplying water or other dissolving liquid to the valve casings 7.

The pipe 35 is connected by means of a coupling 3 to a valve casing 4 within which is located a valve identical with the valve 5 shown in Figs. 1 and 2, which valve is operated by a handle 11 identical with the handle 11 shown in Figs. 1 and 2. The tubular casings 7 are connected by means of a coupling 36 to the forward or front side of the valve casing 4 which coupling comprises branches 37 to which the rear ends of the tubular casings 7 are connected. The portions of the structure comprising the parts 6, 10, 16, 18, 20, 21, 22, 25, 32 and 33 are identical with the parts correspondingly numbered in Figs. 1 and 2 of the drawings.

In the construction as illustrated in Fig. 3 the front or forward ends of the tubular casings 7 are connected by means of couplings 40 directly with the branches 41 which are united at 42. The portion at 42 is connected by means of a coupling 43 to the rear end of a pipe 44 which extends or leads to the point of application of the foam which is produced by the confluence or uniting of the two streams of water which emerge from the tubular casings or valve sleeves 10.

The principle of operation of the construction as illustrated in Fig. 3 is identical with that illustrated in Figs. 1 and 2, but the construction as illustrated in the former figure of the drawing is more compact and possibly is more easily handled than that illustrated in Figs. 1 and 2 in which pipes 30 of indefinite length may be employed. In either case, that is, in either form of construction, the substances which are to be employed for foam producing purposes as above described are separately introduced into separate and distinct flowing streams of water which afterwards are united into a single stream in which the reactions take place to produce the fire extinguishing foam.

It will be apparent that by my invention I avoid the formation of foam within or near the points where the substances are introduced into the flowing streams and thereby prevent any interference with the free discharge of the substances from the respective hoppers into the said streams.

Having thus described my invention, what I claim and desire to secure by Letters Patent is:

1. Fire extinguishing apparatus comprising a plurality of conduits through which water is adapted to flow, the forward ends of said conduits being united to form a single eduction conduit, valves for controlling the flow of water through said conduits, hoppers in communication with the first named conduits, means located within said conduits in operative relation to the discharge ends of said hoppers whereby the flow of water therethrough is adapted to cause discharge of said material from said hoppers into the said conduits, and rotatable tubular valve sections mounted within the first named conduits in operative relation to the discharge ends of said hoppers for opening and closing said discharge ends.

2. Fire extinguishing apparatus comprising a plurality of conduits through which water is adapted to flow, a water induction pipe connected to one end of each of said conduits, a valve in said pipe for controlling the supply of water to said conduits, an eduction pipe to which the opposite end of each of said conduits is connected, hoppers mounted upon the said conduits and being in communication with the passageways therethrough, the said hoppers being adapted to receive and hold substances in powdered form, means located within said conduits in operative relation to the discharge ends of said hoppers for withdrawing the powdered substances from the said hoppers, and rotatable tubular valves mounted within said conduits in operative relation to the discharge ends of said hoppers for controlling the discharge of powdered substances from the said hoppers, and the said last mentioned means projecting into the said rotatable tubular valves and terminating in adjoining operative relation to the discharge ends of said hoppers.

In testimony that I claim the foregoing as my invention, I have hereunto signed my name this 14th day of June, 1927.

FISHER L. BOYD.